United States Patent
Kim (10) Patent No.: US 12,014,626 B2
(45) Date of Patent: Jun. 18, 2024

(54) VEHICLE SPEED PREDICTION APPARATUS AND PREDICTION METHOD USING THE SAME

(71) Applicants: Hyundai Motor Company, Seoul (KR); Kia Corporation, Seoul (KR)

(72) Inventor: Nam Hyuk Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 315 days.

(21) Appl. No.: 17/409,201

(22) Filed: Aug. 23, 2021

(65) Prior Publication Data

US 2022/0180737 A1   Jun. 9, 2022

(30) Foreign Application Priority Data

Dec. 8, 2020   (KR) .................. 10-2020-0170853

(51) Int. Cl.
*G08G 1/01* (2006.01)
*G06N 3/04* (2023.01)

(52) U.S. Cl.
CPC ............. *G08G 1/0125* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2008/0033630 A1* | 2/2008 | Lee | G08G 1/0104 340/995.13 |
| 2018/0181865 A1* | 6/2018 | Adachi | G06N 3/08 |
| 2020/0111348 A1* | 4/2020 | Gentile | G08G 1/0112 |
| 2021/0090435 A1* | 3/2021 | Qiu | G08G 1/052 |

\* cited by examiner

*Primary Examiner* — James M McPherson
*Assistant Examiner* — Bakari Underwood
(74) *Attorney, Agent, or Firm* — Fox Rothschild LLP (57) ABSTRACT

A vehicle speed prediction apparatus includes a data preprocessor that performs preprocessing of correct answer data and input data for deep learning, and a deep learning modeling device that is configured to learn a relationship of a lane speed for each exit lane, based on a representative speed per link, the number of collected probes, and a collection time.

17 Claims, 10 Drawing Sheets

| COLLECTION RATE | STRAIGHT AHEAD | | | | RIGHT TURN | | | | LEFT TURN |
|---|---|---|---|---|---|---|---|---|---|
| | ① | ② | ③ | ④ | ① | ② | ③ | ④ | ① |
| As-is (WHEN USING DATA FOR EACH LANE) | 24.22% | 9.21% | 72.26% | 80.99% | 7.91% | 1.78% | 20.27% | 66.73% | 10.90% |
| To-be (WHEN APPLYING DEEP LEARNING) | 75.55% | 75.33% | 97.99% | 99.56% | 75.55% | 75.33% | 97.99% | 99.56% | 75.55% |

① GWANGMUNGO INTERSECTION (TURNS IN THREE DIRECTIONS)
② SINSA STATION INTERSECTION (EXTREME CONGESTION SECTION)
③ DONGBUJEGANG ENTRANCE INTERSECTION (MANY QUEUE LINKS)
④ SAPYEONG-DAERO BANPO IC ENTRY SECTION (HIGHWAY ENTRY)

| TIME | PATTERN FOR EACH LANE BASE | | DEEP LEARNING PREDICTION BASE | |
|---|---|---|---|---|
| 18:05 | CORRECTION SPEED | MAPE [%] | CORRECTION SPEED | MAPE [%] |
| | 7.12 | 252.48 | 2.08 | 2.97 |
| 18:13 | USING ACTUAL PASSING SPEED 2.02 | | | |

VEHICLE SPEED PREDICTION APPARATUS AND PREDICTION METHOD USING THE SAME

CROSS-REFERENCE TO RELATED APPLICATION

This application claims under 35 U.S.C. § 119(a) the benefit of Korean Patent Application No. 10-2020-0170853, filed in the Korean Intellectual Property Office on Dec. 8, 2020, the entire contents of which are incorporated herein by reference.

BACKGROUND

(a) Technical Field

The present disclosure relates to a vehicle speed prediction apparatus and a prediction method using the same, more particularly, to a deep learning-based vehicle speed prediction apparatus for each lane and a vehicle speed prediction method using the same.

(b) Description of the Related Art

In general, traffic speed may be predicted through a manner of predicting a speed value after a "b" minute in the future by using speed data up to an "a" minute (temporal range) in the past of a corresponding point (spatial range). In the present specification, the traffic speed, which means a speed of a vehicle traveling on a road, may be collected by using an average speed of probes (vehicles) passing through a general link (road section), which is the smallest unit of the road. That is, the traffic speed may be calculated through a driving time and a driving distance of the probes that have all passed through the links.

On the other hand, when a continuous general link at which congestion persists is referred to as a link for each lane, since the length of the link is long, the probes that pass through only a part of the link may frequently occur, and it is difficult to collect the speed in units of links for each lane. In other words, the speed of each lane at which congestion persists has a lower probe collection rate than that of a general link speed, and thus reliability is degraded.

When the speed of the link for each lane is not generated like this, the speed is predicted using a collected pattern speed in the same time period in the past. However, since the past pattern speed does not reflect the current traffic conditions, the accuracy is low due to low real-time properties. This results in inaccurate arrival time prediction and lowers user satisfaction.

Accordingly, there is a need to improve the accuracy of predicting the speed for each lane and predicting the arrival time reflecting the actual traffic conditions at the time when the speed for each lane is not collected.

SUMMARY

An aspect of the present disclosure provides a vehicle speed prediction apparatus for each lane and a vehicle speed prediction method capable of effectively predicting an accurate vehicle speed for each lane reflecting real-time traffic conditions.

An aspect of the present disclosure provides a vehicle speed prediction apparatus for each lane and a vehicle speed prediction method to which a deep learning model that is configured to learn the relationship of a speed for each exit lane is applied by using real-time speed, a speed of a lane that is not classified as an exit lane.

An aspect of the present disclosure provides a vehicle speed prediction apparatus for each lane and a vehicle speed prediction method that perform preprocessing that converts different kinds of data representing traffic conditions into data suitable for deep learning models.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle speed prediction apparatus includes a data preprocessor that performs preprocessing of correct answer data and input data for deep learning, and a deep learning modeling device that is configured to learn a relationship of a lane speed for each exit lane, based on a representative speed per link, the number of collected probes, and a collection time.

In an embodiment, the deep learning modeling device may be configured to learn using a fully-connected model, the model may include one or more input layers, one or more hidden layers, and one or more output layers, vectors associated with the representative speed per link, the number of collected probes, and the collection time may be input to the one or more input layers, and the one or more output layers may output a speed of a probe driving a link for each lane at the same time point.

In an embodiment, the one or more hidden layers may be composed of a predetermined unit derived through an optimization process, and the deep learning modeling device may apply a normalization process for adjusting a scale of values constituting the unit for each layer.

In an embodiment, the deep learning modeling device may apply a drop out technique for dropping some information of the unit to '0' at a predetermined ratio for each layer.

In an embodiment, the link for each lane representing a section for each lane to be learned may include a queue link of a non-directionality, a from link before an exit lane, and a plurality of exit links (to link1, to link2 . . . ), the representative speed per link may include a speed of the queue link and a speed of the from link, and the lane speed for each exit lane may include the speed of each of the exit links.

In an embodiment, the data preprocessor may include a correct answer data preprocessor that converts probe trajectory data collected by driving all the links for each lane collected at an exit time into data of an entry time basis, and performs a harmonic average processing of the converted data in a preset reference time unit, and an input data preprocessor that performs a harmonic average processing of the representative speed per link in the preset reference time unit.

In an embodiment, the correct answer data preprocessor may derive a representative speed for each lane, based on a sum of a driving distance and a sum of a driving time of all probes traveling in one time slot depending on the time slot divided by one day by the preset reference time unit.

In an embodiment, the input data preprocessor may perform a harmonic average processing of the representative speed per link in units of the time slot and may derive the harmonic average processed representative speed per link in units of the time slot.

In an embodiment, the data preprocessor may perform a min-max normalization on scales of the representative speed per link, the number of collected probes, the collection time, and the lane speed for each exit lane.

In an embodiment, the data preprocessor may use a preset value as missing data, when data on the representative speed per link, the number of collected probes, and the collection time are missed, and the missing data on the representative speed per link may include a first specific value, the missing data on the number of collected probes may include a second specific value, and the missing data on the collection time may include index information of the preset reference time.

According to an aspect of the present disclosure, a vehicle speed prediction method includes a data preprocessing step performing preprocessing of correct answer data and input data for deep learning, and a deep learning modeling step learning a relationship of a lane speed for each exit lane, based on a representative speed per link, the number of collected probes, and a collection time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail through drawings. In adding reference numerals to elements of each drawing, it should be noted that the same elements are assigned the same numerals as possible even if they are indicated on different drawings. In addition, in describing an embodiment of the present disclosure, if it is determined that a detailed description of a related known configuration or function obstructs an understanding of the embodiment of the present disclosure, a detailed description thereof will be omitted.

In describing the elements of the embodiments of the present disclosure, terms such as first, second, A, B, (a), (b), etc. may be used. These terms are only for distinguishing the element from other elements, and the nature, order, or order of the element is not limited by the term. In addition, unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning in the context of the related technology, and should not be interpreted as an ideal or excessively formal meaning unless explicitly defined in this application.

Hereinafter, embodiments of the present disclosure will be described in detail with reference to FIGS. 1 to 8.

The present disclosure relates to a deep learning model that predicts an exact speed for each lane by learning a relationship of a real-time speed, the number of collections, and a time of provision of a general link with a high collection rate, when the speed is missed in a process of providing the speed of the lane-specific link. A speed prediction apparatus for performing such deep learning modeling and a method using the same will be described below with reference to the drawings.

Figure 1:
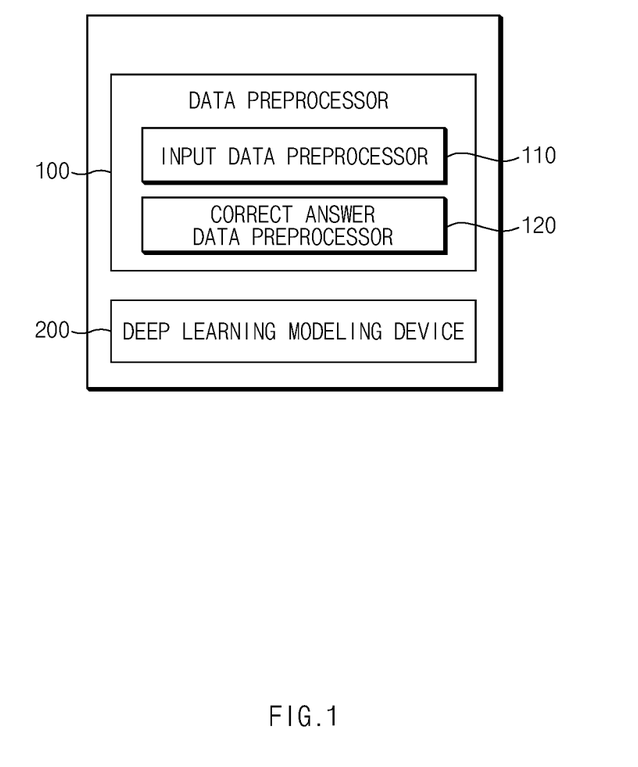
FIG. 1 is a control block diagram of a vehicle speed prediction apparatus according to an embodiment of the present disclosure.

FIG. 1 is a control block diagram of a vehicle speed prediction apparatus according to an embodiment of the present disclosure.

As shown in FIG. 1, a vehicle speed prediction apparatus may include a data preprocessor 100 that performs preprocessing of correct answer data and input data for deep learning, and a deep learning modeling device 200 that learns a relationship of a lane speed for each exit lane, based on a representative speed per link, the number of collected probes, and a collection time.

Figure 2A:
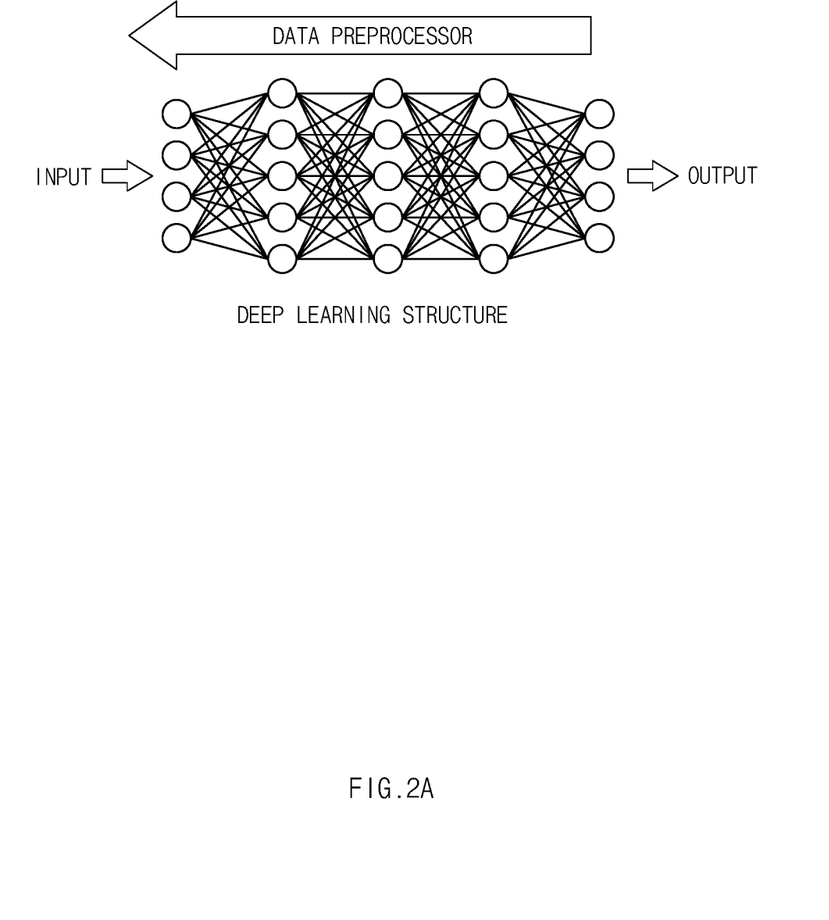
FIGS. 2A and 2B are diagrams illustrating a deep learning modeling according to an embodiment of the present disclosure.
Figure 2B:
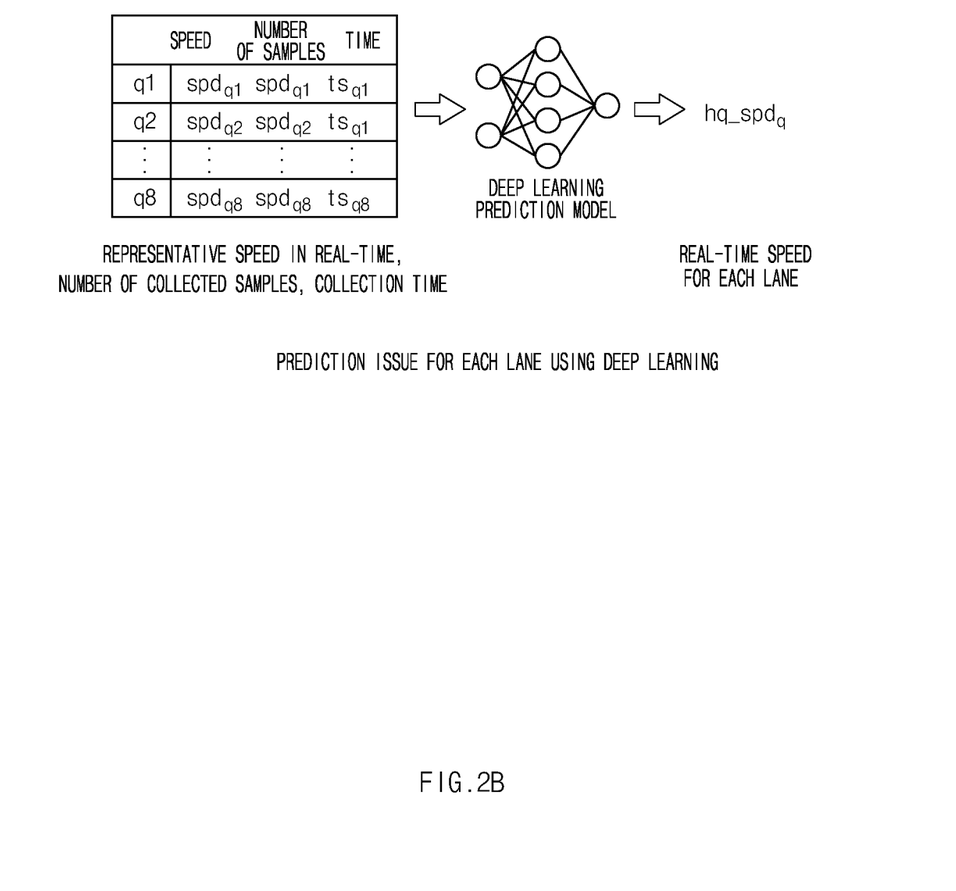

The vehicle speed prediction apparatus may include deep neural networks having one or more hidden layers, that is, an algorithm capable of performing the deep learning modeling, as illustrated in FIGS. 2A-2B, and may be implemented with a device capable of executing the algorithm.

In particular, the vehicle speed prediction apparatus according to the present embodiment seeks to solve an issue of predicting for each lane by utilizing deep learning (see FIG. 2A), which has recently exhibited remarkable performance in various fields. The deep learning may learn a nonlinear relationship between input data and output data by using the deep neural networks, is easy to input various types of data at once by using the deep neural networks. Since a model may learn the relationship of each data by itself, the deep learning may effectively derive a prediction value desired by a user.

According to an example, the deep learning modeling device 200 may learn using a fully-connected model, and the model may include one or more input layers, one or more hidden layers (e.g., 6 hidden layers), and one or more output layers.

Figure 3:
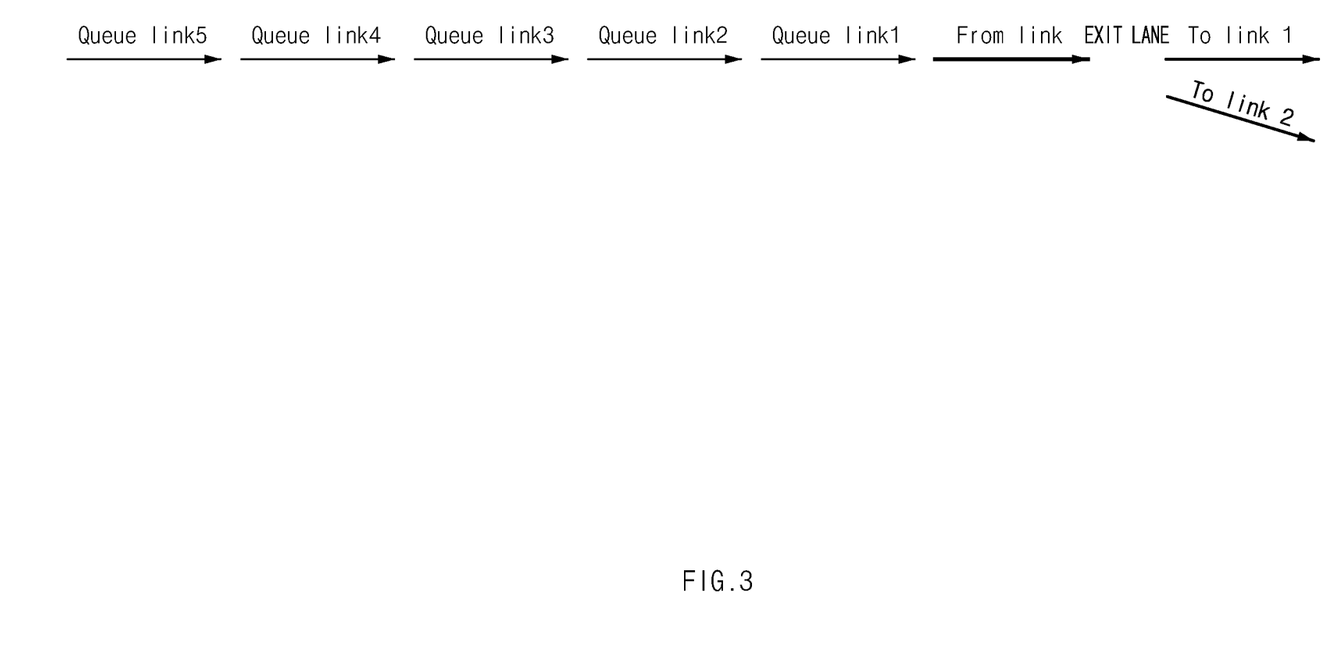
FIG. 3 is a diagram illustrating a link for each lane according to an embodiment of the present disclosure.

On the other hand, FIG. 3 is a diagram illustrating a link for each lane according to an embodiment of the present disclosure.

As illustrated, a link for each lane indicating a section for each lane as an object of learning may include a queue link having a non-directionality, a "from link" before an exit lane, and a plurality of exit links ("to link 1", "to link 2" . . . ).

In an embodiment, the vehicle speed is predicted for each exit link ("to link 1", "to link 2" . . . ) through the deep learning modeling, and the speed of the vehicle including the speed for each link may be defined as a speed for each lane or a speed for each exit lane.

As illustrated in FIG. 2B, the representative speed per link (real-time representative speed), the number of collected probes (the number of collected samples), and the collection time may be input to the input layer, and the speed of the probe traveling on the link for each lane at the same time, that is, the real-time speed for each lane, may be derived from the output layer.

In particular, the input layer is designed to have a dimension of (queue link+the number of from links)*3, and a vector for the representative speed per link, the number of collected probes, and the collection time, for example, vectors of [link speed, the number of probe collections, and entry time] per general link may be added in a row to form an input vector.

The link speed is a speed based on the queue link and the from link, and the number of collections may mean the number of probes entering a corresponding time slot.

In addition, according to an example, the hidden layer may be composed of [64, 128, 128, 128, 64, 32] through an experimental optimization process.

The deep learning modeling device 200 may apply a batch normalization for each layer, which adjusts a scale of the values of the individual hidden layers such that they are not skewed to either side, and may apply a drop out technique for each layer, which drops some information of a unit to '0' during learning at a predetermined ratio such that the learning is not to be focused on learning data. The predetermined ratio may be set to about 15%.

In addition, the deep learning modeling device 200 may design modeling to apply a widely used Relu function as an activation function, and may use an Adam optimizer as an optimization algorithm to perform model optimization.

Accordingly, the deep learning modeling device 200 may receive the representative speed per link, the number of collected probes, and information of the collected time in the queue link and the from link at the same time, and may predict the speed for each lane.

Since the speed for each lane is generated according to the exit lane, as mentioned above, by using the representative speed of each queue link that does not have directionality, it may be designed to learn the relationship among straight ahead (main lane), right turn (exit lane 1), and left turn (exit lane 2). The deep learning modeling device 200 may learn the relationship among the speed, the number of collections, the entry time, and the speed for each lane.

On the other hand, the data preprocessor 100 according to the present embodiment may include a correct answer data preprocessor 120 that converts probe trajectory data collected by driving all the links for each lane, collected at an exit time into data of an entry time basis, and performs a harmonic average processing (e.g., aggregation) of the converted data in a preset reference time unit, and an input data preprocessor 110 that performs a harmonic average processing of the representative speed per link in the preset reference time unit.

The correct answer data preprocessor 120 may derive the representative speed for each lane, based on a sum of a driving distance and a sum of a driving time of all probes traveling in one time slot depending on the time slot divided by one day by the preset reference time unit.

The correct answer data may be derived using the probe trajectory data collected by driving all links for each lane, and such probe trajectory data may be collected as an actual driving distance and a required time corresponding to the link. Since all the collected data are recorded based on the exit time, the correct answer data preprocessor 120 may convert the collected data into data corresponding to the entry time by subtracting the required time from the exit time.

For example, as 288 time slots are set by dividing 1440 minutes per day into 5 minute increments, and by dividing the sum of the driving distances of all probes that travels during one time slot by the sum of travel times to derive the harmonic average, based on the entry time, the representative speed for each exit link, that is, for each lane (for each direction of rotation) may be calculated. The calculated representative speed is used as the correct answer data of the corresponding time slot.

The input data preprocessor 110 may perform a harmonic average processing of the representative speed per link in units of the time slot and may derive the harmonic average processed representative speed per link in units of the time slot.

In an embodiment, the input data may be derived using a real-time speed link of a general link constituting a link for each lane. The real-time speed of the general link is a speed that is collected by being calculated and corrected as a median value of probes traveling in a corresponding section in the units of one minute. The input data preprocessor 110 performs harmonic averaging processing on the collected information in units of time slots corresponding to 5 minutes, and derives the representative speed for each time slot.

The data preprocessor 100 may perform a min-max normalization on a scale of the representative speed per link, the number of collected probes, the collection time, and the lane speed for each exit lane.

Since the scales of the three types of data, that is, the speed, the number of samples, and entry time input as input data to the learning layer are different, a normalization is required. The data preprocessor 100 uses the maximum and minimum values of all speed data for the input/correct answer data to normalize the minimum-maximum in the same scale, and may perform a min-max normalization on the number of collections by using the maximum and minimum values of all the number of probes that have entered the corresponding time slot. In addition, the entry time information may be converted into an index of 288 time slots at a corresponding time, and may undergo the min-max normalization process.

The learning data may be configured based on the input data preprocessed in this way and output data, and according to this embodiment, the batch size is selected as 32 by experimentally optimizing.

The entire data set is randomly mixed and is verified as a 5-cross validation set, and the maximum epoch is selected as 1000.

On the other hand, the data preprocessor 100 according to the present embodiment may use a preset value as the missing data when data about the representative speed per link, the number of collected probes, and the collection time are missed.

The learning data may be configured only when the correct answer data (probe trajectory data) are collected, and it is possible to configure the learning data through processing of input data missing value when the correct answer data are collected, but any input data (the real-time speed of the general link) are missed. By compensating for the missing data, a larger number of the learning data may be secured and learning accuracy may be improved.

The missing data associated with the representative speed per link may be set as a first specific value.

As a specific example, when input data are missed, as a result of the experiment by selecting the missing speed value as −1, −9999, and 0, since the result of learning with −1 has the highest learning accuracy, according to an example, the missing data associated with the representative speed per link may be set to −1.

The data preprocessor 100 may configure the input data by using the general link speed value of −1, the number of probe collections of 0, and the corresponding entry time slot index information associated with the missing input data.

Hereinafter, an experimental example for verifying a validity of the deep learning modeling according to the present embodiment will be described.

Collection speed data associated with the link probes for each lane and the real-time representative speed data of the general link are set as utilization data, the four spaces in Seoul are limited as a spatial range, and time from Jan. 10, 2020 to Mar. 31, 2020 is limited as a temporal range. The number of samples that may be learned by 5-minute aggregation is 23616.

To verify the modeling, the entire data are divided into five, divided into a train set and a test set, and five cross validation is used to evaluate the accuracy average of each test set.

In addition, it is possible to shorten the learning time by applying an early stop function in an epoch in which the accuracy of the verification set is guaranteed by utilizing a part of the train set as a validation set.

Figure 4:
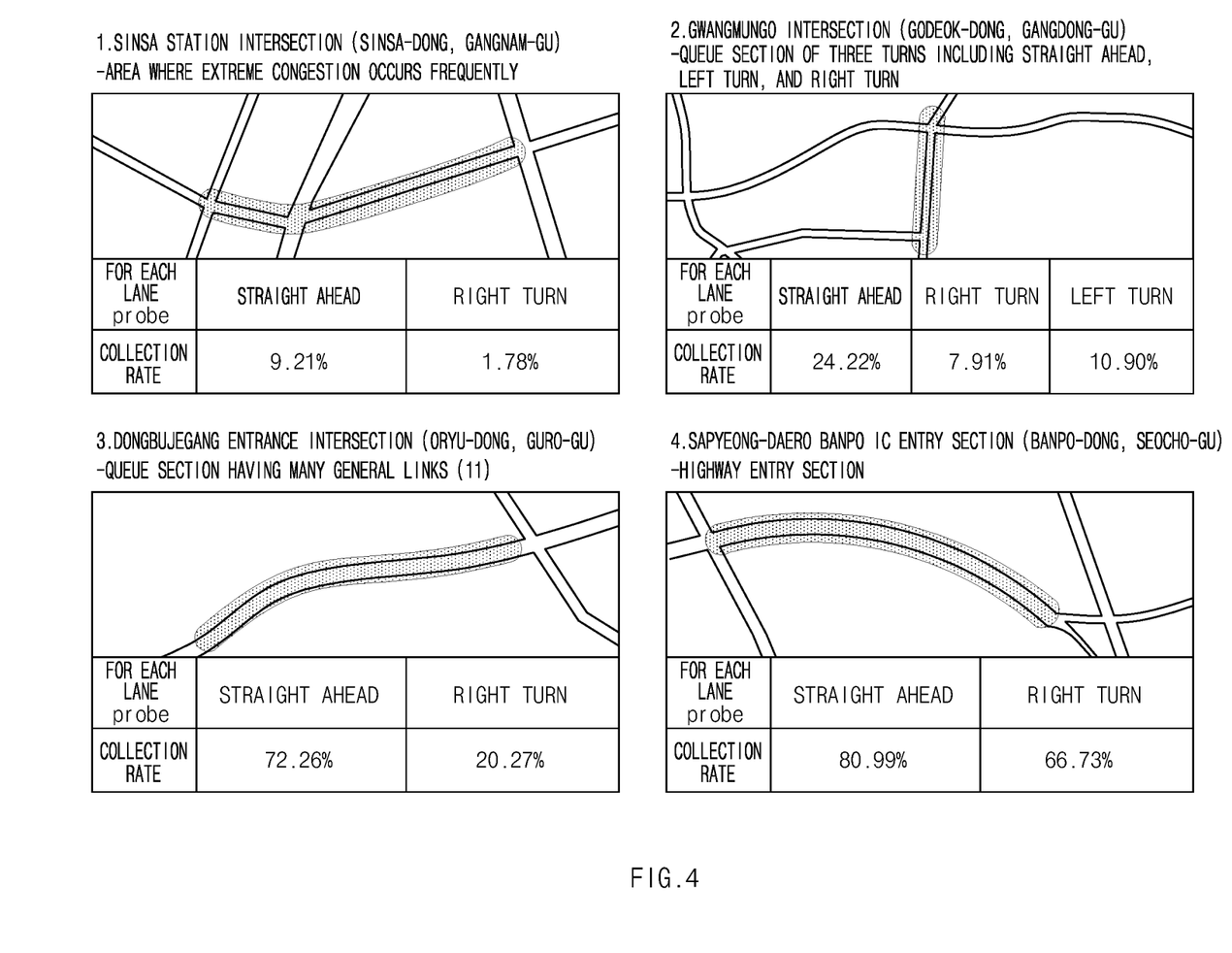
FIG. 4 is a diagram illustrating a target area for verifying a deep learning modeling according to an embodiment of the present disclosure.

FIG. 4 a diagram illustrating a target area for verifying a deep learning modeling according to an embodiment of the present disclosure.

As illustrated in FIG. 4, to verify the prediction model, total 4-sections of 1. Sinsa station intersection (Sinsa-dong, Gangnam-gu), 2. Gwangmungo intersection (Godeok-dong, Gangdong-gu), 3. Dongbujegang entrance intersection (Oryu-dong, Guro-gu), and 4. Sapyeong-daero Banpo IC entry section (Banpo-dong, Seocho-gu) are selected.

Each section may include a specificity of the road, for example, Sinsa station intersection with characteristics of area where extreme congestion occurs frequently, Gwangmungo intersection with characteristics of a queue section of three turns including straight ahead, left turn, and right turn, Dongbujegang entrance intersection with characteristics of the queue section having many general links (11), and Sapyeong-daero Banpo IC entry section with characteristics of the highway entry section may be set.

Figure 5:
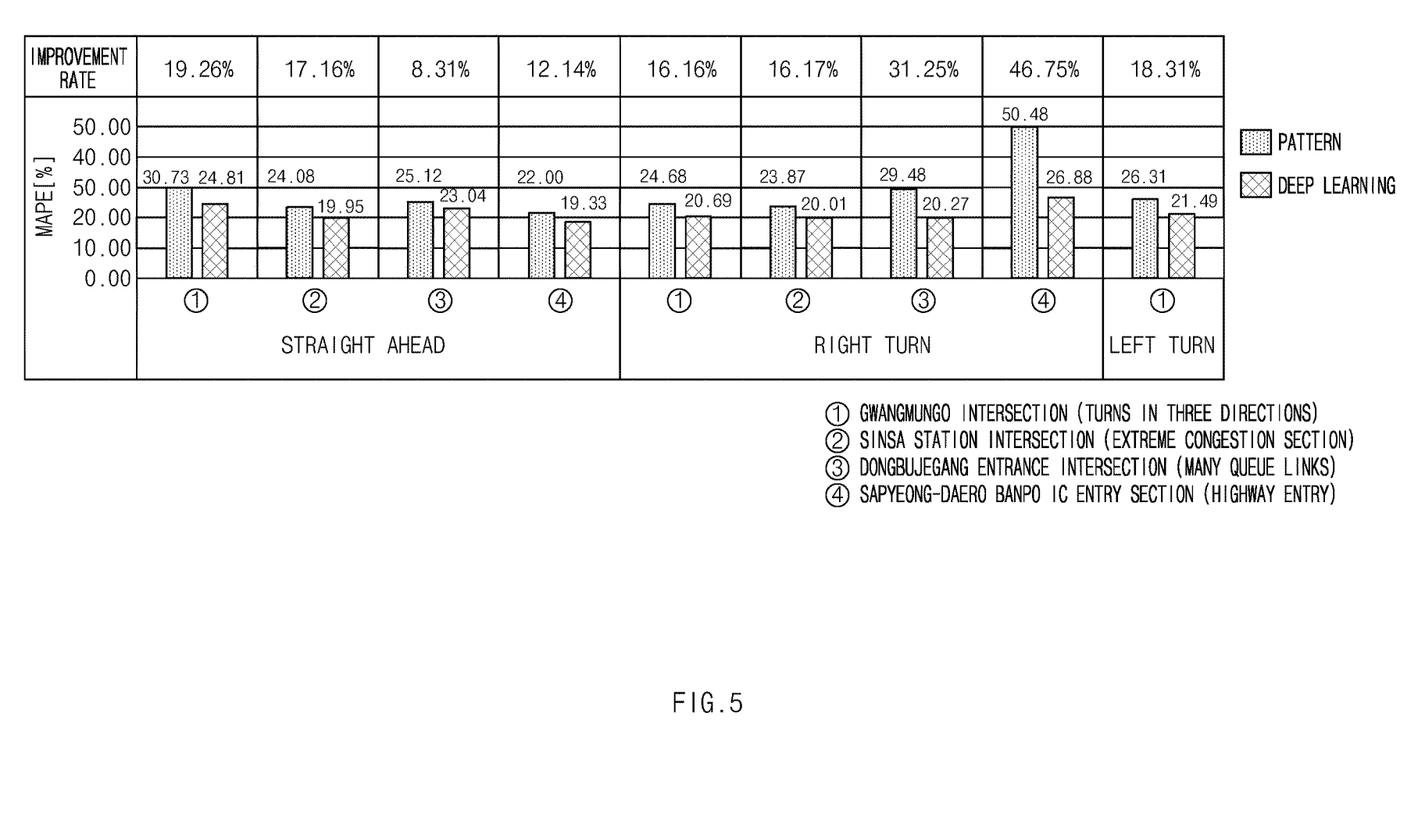
FIG. 5 is a graph comparing errors between a deep learning modeling according to an embodiment of the present disclosure and an existing pattern speed replacement method.

FIG. 5 is a graph comparing errors between a deep learning modeling according to an embodiment of the present disclosure and an existing pattern speed replacement method, and when the deep learning modeling is used rather than the existing pattern speed replacement method (baseline), FIG. 5 indicates the degree of improvement in the relative error (Mean Absolute Percentage Error; MAPE).

The existing pattern speed replacement method is a method that replaces the prediction speed by using the collected pattern speed at the same time in the past, and since it does not reflect the current traffic conditions, there is a limit of low accuracy due to low real-time properties.

As illustrated in FIG. 5, in the case of the deep leaning modeling, it may be seen that the relative error (MAPE) is improved over the existing pattern replacement method. That is, as the relative error value decreases, the accuracy of vehicle speed prediction improves.

In the case of ② Sinsa station intersection, where the arrival time error often occurs because the collection rate is relatively low, it may be seen that both straight ahead and right turn have a relative error of about 20%. Also, in the case of ④ Sapyeong-daero Banpo IC entry section, which is the entry lane of the highway, it may be seen that the accuracy is improved by about 12% despite the high collection rate in the straight ahead lane.

In addition, in the case of the right-turn exit lane of ④ Sapyeong-daero Banpo IC, there is an error of 50.48% when the existing pattern replacement method is used, but when the deep learning prediction is used, an error of 26.88% appears, improving the error rate by about 46% or more.

Through FIG. 5, it may be seen that the accuracy is improved by at least 8% and at most 50% when the deep learning modeling is applied compared to the existing pattern replacement method.

Figure 6:
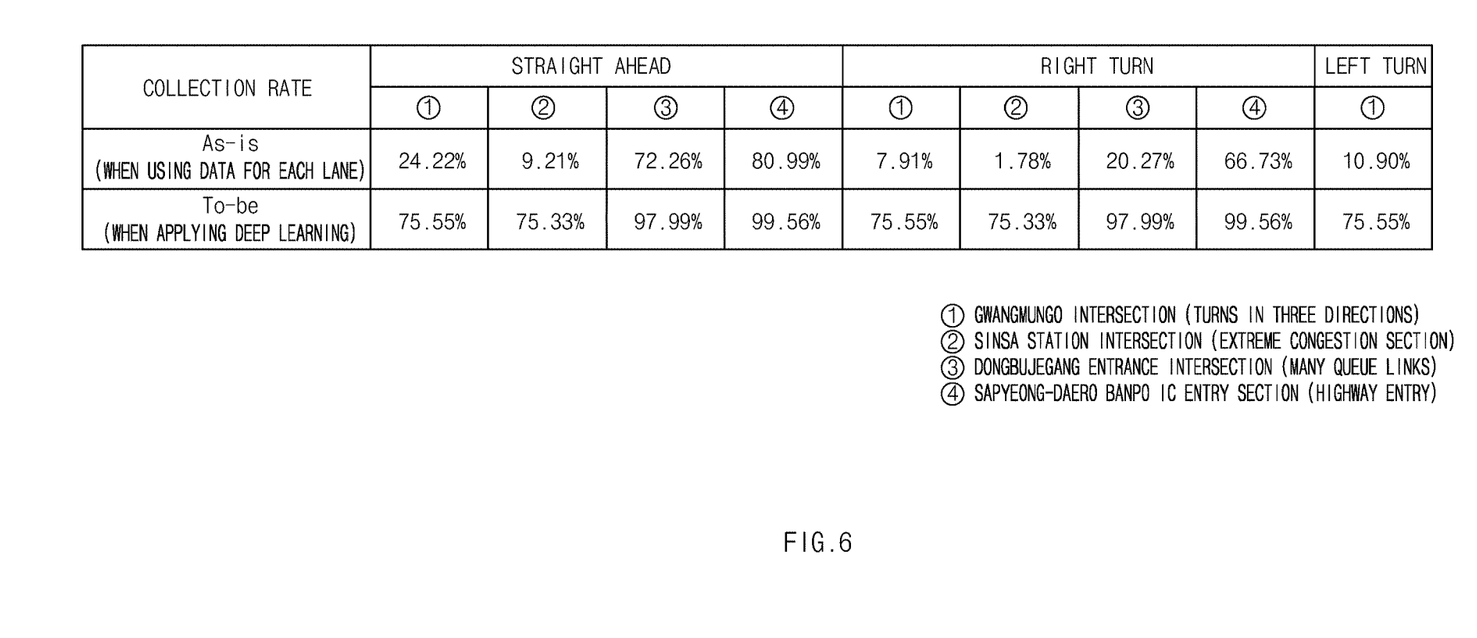
FIG. 6 is a table comparing collection rates of the deep learning modeling according to an embodiment of the present disclosure and an existing pattern speed replacement method.

FIG. 6 is a table comparing collection rates of the deep learning modeling according to an embodiment of the present disclosure and an existing pattern speed replacement method.

As illustrated in FIG. 6, in the case of ② Sinsa station intersection according to the existing (as-is (when using data for each lane)) method, it shows a collection rate of 10% or less. In this case, the speed cannot but be predicted using the existing pattern speed with an error of 25% (24.08% and 23.87% in FIG. 5) with respect to about 90% or more that are not collected for speed prediction.

In contrast, when the prediction method using the deep learning is used, it is possible to predict with a more accurate value with an error of approximately 20% (19.95% and 20.01% in FIG. 5) in a section of about 75% or more of the total.

In addition, in the case of ④ Sapyeong-daero Banpo IC section and ③ Dongbujegang entrance intersection having many queue links, as a collection rate has about 99%, it may be seen that the pattern speed is hardly utilized.

In this way, when the prediction method utilizing the deep learning is used, the data collection rate may be improved by supplementing the missing data, and the speed prediction accuracy may also be improved.

Figure 7A:
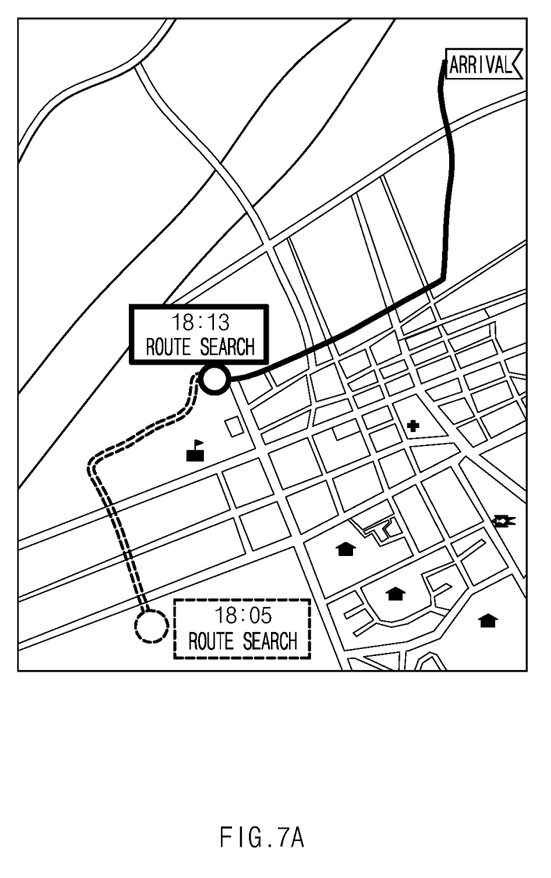
FIGS. 7A and 7B are tables comparing a driving prediction times of a deep learning modeling according to an embodiment of the present disclosure and an existing pattern speed replacement method.
Figure 7B:
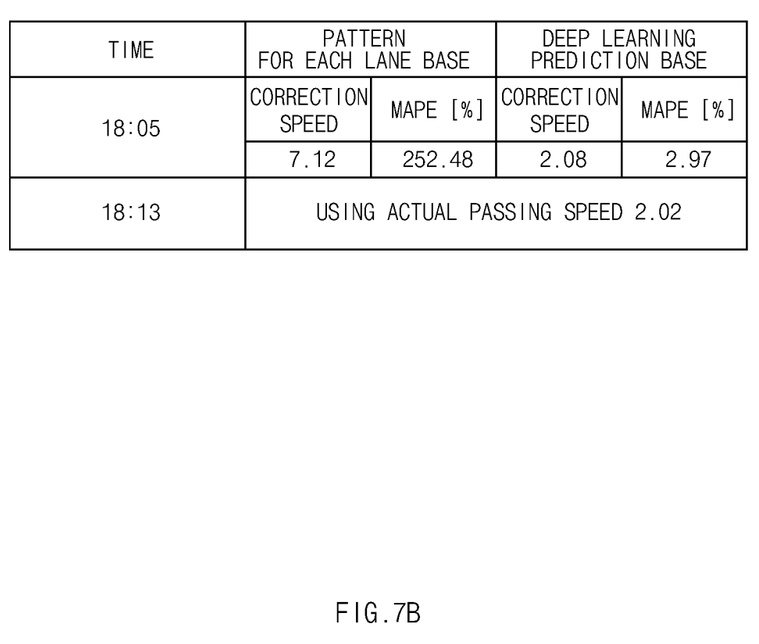

FIGS. 7A-7B are tables comparing a driving prediction times of a deep learning modeling according to an embodiment of the present disclosure and a driving prediction time of an existing pattern speed replacement method, and show the result of conducting an experiment on the probe that travels at the Sinsa Station intersection at an actually specific time (around 18:00 on Feb. 14, 2020).

FIG. 7A shows that the route up to the arrival point is searched at 18:05 and 18:13, and FIG. 7B shows the predicted speed in a table based on pattern-based and deep learning prediction.

When the speed is predicted based on the existing pattern, since the speed for each lane is missing when a route search is attempted at 18:05, the existing pattern speed of 7.12 km/h is used. Thereafter, at 18:13, the actual vehicle speed is 2.02 km/h, but when predicted using the existing pattern speed of 7.12 km/h, the prediction error is a whopping 252.48%. In other words, the expected arrival time is increased, resulting in a large error in the arrival time.

In contrast, in the case of using the deep learning, the speed for each lane is predicted to be 2.08 km/h when searching at 18:05, and the vehicle speed at the time of 18:13 is 2.02 km/h, so it may be confirmed that the error rate is significantly improved (252.48%→2.97%).

That is, since the existing pattern speed does not reflect the real-time traffic conditions, the arrival time error occurs largely in a single case. In contrast, more accurate prediction of arrival time is possible when the deep learning predicted by using real-time speed is used.

Figure 8:
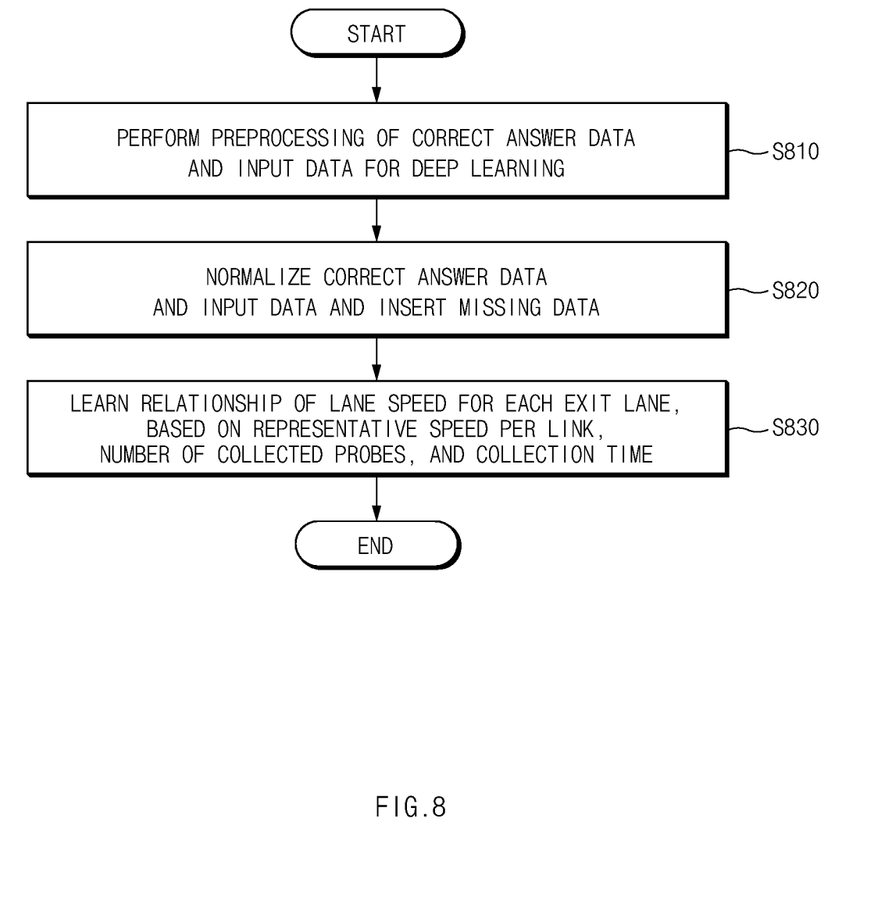
FIG. 8 is a control flowchart of a vehicle speed prediction method according to an embodiment of the present disclosure.

FIG. 8 is a control flowchart of a vehicle speed prediction method according to an embodiment of the present disclosure.

The vehicle speed prediction method according to the present embodiment may be summarized as follows with reference to FIG. 8.

First, the data preprocessor 100 of the vehicle speed prediction apparatus may perform preprocessing of correct answer data and input data for the deep learning (S810).

The data preprocessor 100 performs data preprocessing through scaling and normalization of data for learning.

In particular, the data preprocessor 100 may perform the harmonic average processing on the representative speed of per link in units of the reference time, may convert the probe trajectory data collected by driving all the links for each lane collected at the exit time into data based on the entry time, and may perform the harmonic average processing on the converted data in the preset reference time unit.

The speed for each lane for vehicle speed prediction should be output based on the link entry time for each lane, but since the probe trajectory data used as the correct answer data are collected based on the exit time, it is necessary to convert the probe trajectory data based on the entry time. The data preprocessor 100 may generate the correct answer data by performing the harmonic average processing (aggregation) on the entry time in the preset reference time unit, for example, a reference 5-minute unit.

In addition, the data preprocessor 100 may generate the input data by performing the harmonic average processing (aggregation) on the representative speed of the general links constituting the links for each lane that are collected in units of one minute in units of 5 minutes, which is the reference time unit.

According to an example, the data preprocessor 100 may derive the representative speed for each lane, which is the correct answer data, based on a sum of the driving distance and a sum of the driving time of all probes traveling in one time slot depending on the time slot where one day is divided by the reference time unit, may perform the harmonic average processing of the representative speed per link in units of the time slot, and may derives the harmonic average processed representative speed per link, which is the input data, in units of the time slot.

In addition, the data preprocessor 100 may perform preprocessing of normalizing the correct answer data and the input data and inserting the missing data (S820).

Since the scales of the three types of data, that is, the speed, the number of samples, and entry time are different, the normalization is required, and the data preprocessor 100 may perform the min-max normalization on the representative speed per link, the number of collected probes, the collection time, and the lane speed for each exit lane, that is, the scales of the input data and the correct answer data.

The data preprocessor 100 may apply the min-max normalization that adjusts to the same scale by using the maximum value and the minimum value with respect to the speed data of the input data and the correct answer data, may apply the min-max normalization with respect to the number of probes representing the number of probes that are entered the corresponding time slot by using the maximum and minimum values of all probe collections, and may similarly apply the min-max normalization with respect to the entry time information after converting to indexes of 288 time slots at the corresponding time.

On the other hand, in the data preprocessing step, when data associated with the representative speed per link, the number of collected probes, and collection time are missed, the preset value may be used as the missing data.

For example, the missing data on the representative speed per link may use a first specific value (e.g., −1), the missing data on the number of collected probes may use a second specific value (e.g., 0), and the missing data on the collection time may use the index information of the preset reference time. Since such missing cases are included in the learning data, learning accuracy may be improved.

When such data are preprocessed and learning is performed, the deep learning modeling for learning the relationship of lane speed for each exit lane, based on the representative speed per link, the number of collected probes, and the collection time may be performed (S830).

The deep learning modeling step may be learned using a fully-connected model. In this case, the model for learning may include one or more input layers, one or more hidden layers (e.g., 6 hidden layers), and one or more output layers. According to an example, vectors for the representative speed per link, the number of collected probes, and the collection time, which are input data, may be input to the input layer, and the output layer may output the speed of the probe traveling on the link for each lane at the same time.

In addition, according to an example, the hidden layer may be composed of a predetermined unit derived through an optimization process, for example, as the unit of [64, 128, 128, 128, 64, 32].

In addition, in the deep learning modeling step, the normalization process that adjusts the scale of values constituting the unit may be applied to each layer.

In addition, in the deep learning modeling step, the modeling algorithm may be corrected such that the learning is not focused on the learning data by applying the drop out technique for dropping some information of the unit to '0' to each layer at the predetermined ratio.

Through such learning modeling, it is possible to predict the speed for each lane or predict the arrival time, and the accuracy and the collection rate may be improved at the same time compared to the existing method.

As described above, the present disclosure relates to a deep learning model for predicting the speed for each lane by using real-time traffic information of a general link that forms the missing when the speed of a link for each lane is missing, may predict the speed for each lane by using the real-time speed of the general link with a high collection rate when an appropriate speed for each lane is not provided due to existing collection rate with a low rate, and may predict a more sophisticated speed for each lane by providing information on the number of collections and entry time along with the speed data. The present disclosure is possible to provide higher prediction accuracy than the existing replacement method by reflecting real-time traffic conditions rather than the pattern speed used when the speed for each lane is missed in the existing method.

According to an embodiment of the present disclosure, a vehicle speed prediction apparatus and a vehicle speed prediction method for each lane may effectively predict an accurate speed for each lane reflecting real-time traffic conditions.

According to an embodiment of the present disclosure, a vehicle speed prediction apparatus and a vehicle speed prediction method for each lane may apply a deep learning model for learning the relationship of the speed for each exit lane by using real-time speed with respect to the speed of a lane that is not classified as the exit lane.

According to an embodiment of the present disclosure, a vehicle speed prediction apparatus and a vehicle speed prediction method for each lane may perform preprocessing that converts different types of data representing traffic conditions into data suitable for a deep learning model.

In addition, according to an embodiment of the present disclosure, a vehicle speed prediction apparatus and a vehicle speed prediction method for each lane may apply a deep learning model that outputs a predicted speed for each lane reflecting real-time rather than a pattern speed, when real-time traffic information is not collected and the speed for each lane is not generated.

Through this, the accuracy and the collection rate may be improved at the same time by utilizing the speed prediction for each lane reflecting real-time traffic information, unlike the pattern speed, and the arrival time provided to the user may be significantly supplemented.

In addition to this, various effects that are directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A vehicle speed prediction apparatus comprising:
a memory storing program instructions; and
a processor configured to execute the program instructions, the program instructions when executed configured to:
perform preprocessing of answer data and input data for deep learning;
learn a relationship of a lane speed for each exit lane of a road, based on a representative speed per link, a number of collected probes, and a collection time, by using a deep learning modeling device;
convert probe trajectory data collected by driving all the links for each lane at an exit time into data of an entry time basis, and perform a harmonic average processing of the converted data in a preset reference time unit, by using an answer data preprocessor; and
perform a harmonic average processing of the representative speed per link in the preset reference time unit, by using an input data preprocessor,
wherein the answer data is derived using the probe trajectory data collected by driving all the links for each lane,
wherein the road includes at least one lane and a plurality of the links that indicate a section of the at least one lane as an object of the learning performed by the deep learning modeling device.

2. The apparatus of claim 1, wherein the program instructions when executed are configured to learn using a fully-connected model, by using the deep learning modeling device,
wherein the model includes one or more input layers, one or more hidden layers, and one or more output layers,
wherein vectors associated with the representative speed per link, the number of collected probes, and the collection time are input to the one or more input layers, and
wherein the one or more output layers output a speed of a probe driving a link for each lane at the same time point.

3. The apparatus of claim 2, wherein the one or more hidden layers are composed of predetermined nodes derived through an optimization process, and
wherein the program instructions when executed are configured to apply a normalization process for adjusting a scale of values constituting the nodes for each layer, by using the deep learning modeling device.

4. The apparatus of claim 3, wherein the program instructions when executed are configured to apply a drop out technique for dropping some information of the unit to '0' at a predetermined ratio for each layer, by using the deep learning modeling device.

5. The apparatus of claim 2, wherein the link for each lane representing a section for each lane to be learned includes a queue link of a non-directionality, a from link before an exit lane, and a plurality of exit links,
wherein the representative speed per link includes a speed of the queue link and a speed of the from link, and
wherein the lane speed for each exit lane includes the speed of each of the exit links.

6. The apparatus of claim 1, wherein the program instructions when executed are configured to derive a representative speed for each lane, based on a sum of a driving distance and a sum of a driving time of all probes traveling in one time slot depending on the time slot divided by one day by the preset reference time unit, by using the answer data preprocessor.

7. The apparatus of claim 6, wherein the program instructions when executed are configured to perform the harmonic average processing of the representative speed per link in units of the time slot and derives the harmonic average processed representative speed per link in units of the time slot, by using the input data preprocessor.

8. The apparatus of claim 1, wherein the program instructions when executed are configured to perform a min-max normalization on scales of the representative speed per link, the number of collected probes, the collection time, and the lane speed for each exit lane, by using the processor.

9. The apparatus of claim 8, wherein the program instructions when executed are configured to use a preset value as missing data, when data on the representative speed per link, the number of collected probes, and the collection time are missed, by using the processor, and wherein the missing data on the representative speed per link includes a first specific value, the missing data on the number of collected probes includes a second specific value, and the missing data on the collection time includes index information of the preset reference time.

10. A vehicle speed prediction method comprising:

performing, by a processor, preprocessing of answer data and input data for deep learning;

learning, by the processor, a relationship of a lane speed for each exit lane, based on a representative speed per link, the number of collected probes, and a collection time converting, by the processor, probe trajectory data collected by driving all the links for each lane at an exit time into data of an entry time basis, and performing a harmonic average processing of the converted data in a preset reference time unit and performing, by the processor, a harmonic average processing of the representative speed per link in the preset reference time unit, wherein the answer data is derived using the probe trajectory data collected by driving all the links for each lane.

11. The method of claim 10, wherein the vehicle speed prediction method further includes learning, by the processor, using a fully-connected model, wherein the model includes one or more input layers, one or more hidden layers, and one or more output layers, wherein vectors associated with the representative speed per link, the number of collected probes, and the collection time are input to the one or more input layers, and wherein the one or more output layers output a speed of a probe driving a link for each lane at the same time point.

12. The method of claim 11, wherein the one or more hidden layers are composed of a predetermined unit derived through an optimization process, and wherein the learning step includes learning, by the processor, the relationship of the lane speed for each exit lane by applying a normalization process for adjusting a scale of values constituting the unit for each layer.

13. The method of claim 12, wherein the vehicle speed prediction method further includes applying, by the processor, a drop out technique for dropping some information of the unit to '0' at a predetermined ratio for each layer.

14. The method of claim 10, wherein the vehicle speed prediction method further includes deriving, by the processor, the representative speed for each lane, based on a sum of a driving distance and a sum of a driving time of all probes traveling in one time slot depending on the time slot divided by one day by the preset reference time unit.

15. The method of claim 14, wherein the vehicle speed prediction method further includes performing, by the processor, the harmonic average processing of the representative speed per link in units of the time slot and derives the harmonic average processed representative speed per link in units of the time slot.

16. The method of claim 10, wherein the vehicle speed prediction method further includes performing, by the processor, a min-max normalization on scales of the representative speed per link, the number of the collected probes, the collection time, and the lane speed for each exit lane.

17. The method of claim 16, wherein the vehicle speed prediction method further includes using, by the processor, a preset value as missing data, when data on the representative speed per link, the number of collected probes, and the collection time are missed, and wherein the missing data on the representative speed per link includes a first specific value, the missing data on the number of the collected probes includes a second specific value, and the missing data on the collection time includes index information of the preset reference time.

* * * * *